United States Patent
Ushio et al.

(10) Patent No.: US 8,295,408 B2
(45) Date of Patent: Oct. 23, 2012

(54) RECEIVING APPARATUS AND METHOD FOR SIGNAL DETECTION

(75) Inventors: Yuji Ushio, Ome (JP); Takashi Muto, Hamura (JP)

(73) Assignee: Hitachi, Ltd., Tokyo (JP)

( * ) Notice: Subject to any disclaimer, the term of this patent is extended or adjusted under 35 U.S.C. 154(b) by 372 days.

(21) Appl. No.: 12/648,654

(22) Filed: Dec. 29, 2009

(65) Prior Publication Data

US 2010/0246693 A1    Sep. 30, 2010

(30) Foreign Application Priority Data

Mar. 24, 2009    (JP) .................................. 2009-071136

(51) Int. Cl.
    *H04L 27/06* (2006.01)
(52) U.S. Cl. .......... 375/340; 375/318; 330/252; 327/50; 327/56
(58) Field of Classification Search .......... 375/256–257, 375/259–260, 316, 318, 340, 342, 324–325; 330/252, 253, 84, 295, 98, 124 R; 327/50–56, 327/108, 165
    See application file for complete search history.

(56) References Cited

U.S. PATENT DOCUMENTS

| | | | | |
|---|---|---|---|---|
| 4,851,719 A | * | 7/1989 | Hitomi ........................... | 327/58 |
| 6,980,006 B1 | * | 12/2005 | Nguyen et al. ................ | 324/522 |
| 2005/0012549 A1 | * | 1/2005 | Takeda .......................... | 330/140 |
| 2005/0253659 A1 | * | 11/2005 | Favrat et al. ................... | 331/57 |
| 2006/0255860 A1 | * | 11/2006 | Moussavi ...................... | 330/278 |
| 2007/0070534 A1 | * | 3/2007 | Aemireddy et al. ........... | 360/25 |

FOREIGN PATENT DOCUMENTS

JP          11-205394 A          7/1999

* cited by examiner

*Primary Examiner* — Jean B Corrielus
(74) *Attorney, Agent, or Firm* — Mattingly & Malur, PC (57) ABSTRACT

A differential amplifier stage under a band design whereby a data signal at a maximum transfer rate among received waveforms is subjected to attenuation upon passing through a transmission line is not amplified, and a signal at a transfer rate half the maximum transfer rate is amplified. If it is determined that a signal whose amplitude is larger in value than a high reference voltage, the signal is determined as a signal "1" while if smaller in value than a low reference voltage, the signal is determined as a signal "0". If the first amplitude detector detects that the amplitude of the signal is smaller in value than the high reference voltage, and the second amplitude detector detects that the amplitude of the signal is larger in value than the low reference voltage, the present signal is determined as an inverting signal of an immediately preceding signal.

9 Claims, 6 Drawing Sheets

PRIOR ART

FIG. 9

RECEIVING APPARATUS AND METHOD FOR SIGNAL DETECTION

CLAIM OF PRIORITY

The present application claims priority from Japanese patent application JP 2009-071136 filed on Mar. 24, 2009, the content of which is hereby incorporated by reference into this application.

FIELD OF THE INVENTION

The present invention relates to a transmission apparatus, and more particularly, to a technology for use in high-speed data transfer between devices, effective in speeding up a data transfer.

BACKGROUND OF THE INVENTION

In connection with high-speed data transfer between devices, a demand for high-speed long-distance transfer has lately been mounting. In the case of the high-speed data transfer, there is an increase in transmission loss in a transmission line, and a decrease in received amplitude becomes pronounced. In addition, there will be a pronounced decrease in eye aperture margin due to the effect of inter-symbol interference. Techniques such as pre-emphasis, de-emphasis, and decision feedback are well known as means for solving this problem.

The inter-symbol interference refers to a phenomenon wherein adjacent symbols interfere with each other, thereby causing a waveform to be distorted. The eye aperture margin refers to an aperture width of an eye pattern (eye diagram) in the direction of time base, which is a waveform expression obtained by synchronizing time responses of a signal waveform, with each other, for every basic period before being superimposed one another.

The pre-emphasis, or the de-emphasis is carried out by the action of a feed forward equalizer (FFE) within an integrated circuit on a transmission side. At the time of the pre-emphasis, amplitude of a first bit, in the vicinity of a threshold where a level undergoes transition, is increased. On the other hand, at the time of the de-emphasis, amplitudes of a second bit, and thereafter are decreased.

Further, the decision feedback is carried out by the action of a decision feedback equalizer (DFE) within an integrated circuit on a receiving side. At the time of the decision feedback, data determination of received amplitude that has decreased due to attenuation after passing through a transmission line is determined on by use of a determination result of "1" or "0" once determined against a readout signal, thereby removing inter-symbol interference In JP-A-Hei11(1999)-205394, there is shown a receiving circuit as one example of decision feedback equalizer, for determining which of binary a received digital signal represents, thereby outputting a determination value. More specifically, a value determined previous time is held in a flip-flop, and a result obtained by comparing either of threshold values differing from each other with a received signal according to a held value is outputted as the determination value.

SUMMARY OF THE INVENTION

With a technology represented in JP-A-Hei11(1999)-205394, a transmission signal transmitted via a transmission line is detected by a differential amplifier in the following manner. More specifically, if a transmission signal has a voltage level higher than a predetermined higher reference voltage, the transmission signal is determined High, that is, "1". On the other hand, if the transmission signal has a voltage level lower than a predetermined lower reference voltage, the transmission signal is determined Low, that is, "0".

However, if the higher reference voltage or the lower reference voltage is set to a signal composed of identical bits "0" in succession, or "1" in succession, such as 0000 . . . 1111, or 1111 . . . 0000, there occurs inconvenience in that it is not possible to detect a signal wherein "0" and "1" are alternately repeated, such as 010101 . . . 01, or 101010 . . . 10 even though a data transfer rate is the same. This is because in the case of high-speed data transfer of the signal wherein "0" and "1" are alternately repeated, rising or falling will slow down due to inter-symbol interference, so that it will take longer until a voltage level rises, or falls. As a result, there occurs a problem that a transmission signal cannot be determined if the transmission signal is at a voltage level between the higher reference voltage, and the lower reference voltage.

Figure 8:
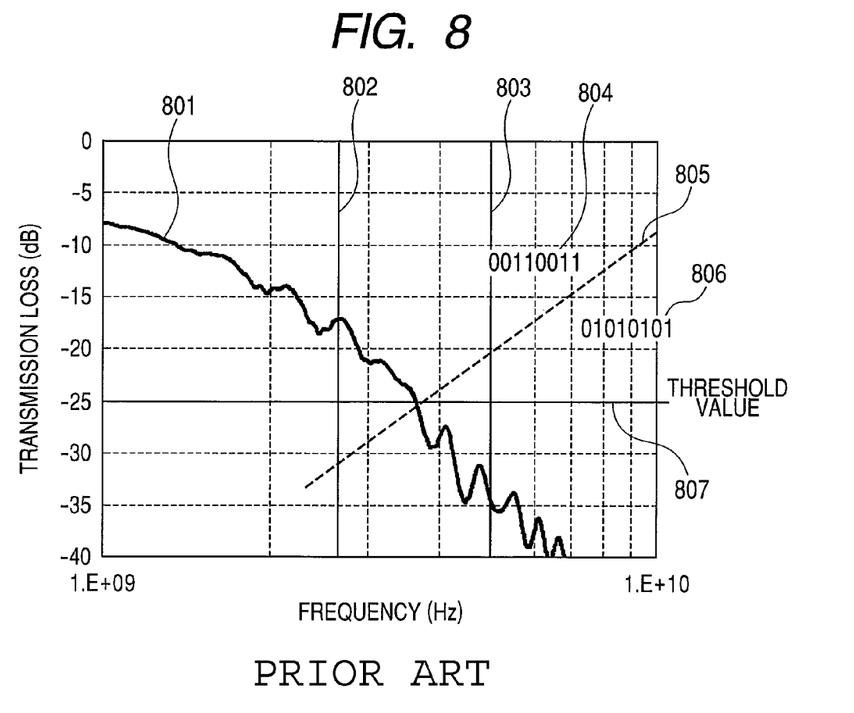
FIG. 8 is a view showing a trend of transmission loss dependence on frequency.

This problem will be described with reference to FIG. 8. FIG. 8 shows a trend of transmission loss dependence on frequency, in a transmission line. In FIG. 8, the horizontal axis indicates frequency, and the vertical axis indicates transmission loss. A straight line 802 indicates a frequency of a low frequency data pattern 804 of "00110011". A straight line 803 indicates a frequency of a data pattern 806 of "01010101". A transmission loss at the low frequency data pattern 804, and a transmission loss at the high frequency 803 corresponding to the high frequency data pattern 806 are −17 dB, and −35 dB, respectively. That is, when a waveform of 1000 mV in amplitude is transmitted to a transmission line having a characteristic of a curve 801, a signal amplitude of the data pattern 804 will be 141 mV, and a signal amplitude of the data pattern 806 will be 17 mV, respectively, after passage. Accordingly, if the higher reference voltage and the lower reference voltage are set to match the signal amplitude of the data pattern 804, it follows that the data pattern 806 cannot be detected.

In addition, a loss for a transmission signal at a high transmission rate will increase as compared with a transmission signal at a low transmission rate. For this reason, if a high-pass filter (HPF) is used in order to equalize a loss amount of a high-frequency voltage component large in loss with that of a low-frequency voltage component small in loss, this will raise a problem that noise, reflection and a ringing component are amplified by the same gain, thereby crushing received waveform margins, in an amplitude direction, and a phase direction, respectively.

In the light of the problem described as above, the invention has been developed, and it is an object of the invention to correctly detect a transmission signal even in the case where there exists a transmission loss due to a change from a transmission signal composed of the identical bits in succession to a different transmission signal.

Now, the overview of a representative one of embodiments of the invention, disclosed under the present application, is briefly described as follows. More specifically, if a first amplitude detector detects that an amplitude of a single ended signal is smaller in value than a higher reference voltage, and a second amplitude detector detects that the amplitude of the single ended signal is larger in value than a lower reference voltage, the present differential signal is determined as the second level signal in the case where an immediately preceding differential signal is determined as the first level signal while the present differential signal is determined as the first level signal in the case where the immediately preceding differential signal is determined as the second level signal.

Data determination can be made without amplifying a data signal at a maximum transfer rate, processing of a noise component of the data signal is difficult to effect upon amplification. As a result of further decrease in a transmission rate of the data signal to be transmitted to a receiving circuit, it is possible to render it easier to set functions for output pre-emphasis/de-emphasis to be effected by the action of a feed forward equalizer (FFE) within an integrated circuit on a transmission side, and to reduce power consumption.

DETAILED DESCRIPTION OF PREFERRED EMBODIMENTS

The invention is described in detail hereinafter on the basis of an embodiment thereof. A transmission method whereby the feed forward equalizer within an integrated circuit on a transmission side is combined with the decision feedback equalizer within an integrated circuit on a receiving side can be applied to a transmission system for execution of high-speed data transfer between devices.

Figure 1:
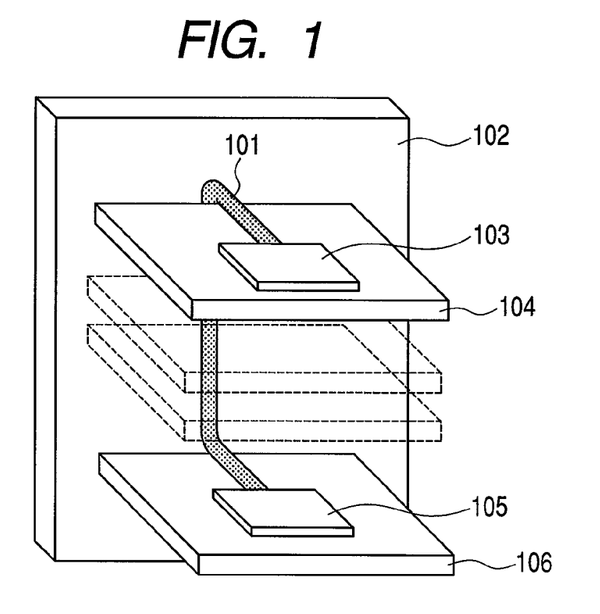
FIG. 1 is a block diagram showing a transfer system between boards, for execution of data transfer.

FIG. 1 is a block diagram showing a high-speed data transfer system between devices. The high-speed data transfer system between devices, includes a signal interconnect 101, a backplane 102, an integrated circuit (LSI) 103, a daughter board 104. An integrated circuit (LSI) 105 is mounted on the daughter board 106.

The signal interconnect is for connecting the integrated circuit (LSI) 103 to the integrated circuit (LSI) 105, and data transfer is effected via the signal interconnect 101. The signal interconnect is also called generally a transmission line. The backplane is a kind of printed circuit board provided with plural connectors, playing a role as a base for correctly connecting between the connectors. Plural printed circuit boards, such as the daughter boards, and so forth, are mutually connected with each other. For carrying out expansion in function, a daughter board with an integrated circuit having a necessary function, mounted thereon, is connected to an unoccupied connector.

The integrated circuit is an electronic component integrating a multitude of elements (circuits) into one because of requirements for multiple-functions. One of constituent circuits thereof includes a serializer-deserializer. The daughter board is a kind of printed circuit board on which an integrated circuit is mounted, and is inserted between the connectors on the backplane. Data outputted from the integrated circuit 103 on the daughter board 104 is inputted to the integrated circuit 105 via the signal interconnect 101 printed on both the daughter board 104, and the backplane 102. Conversely, data outputted from the integrated circuit 105 is inputted to the integrated circuit 103 via the signal interconnect 101. Data transfer is carried out in this way.

Figure 2:
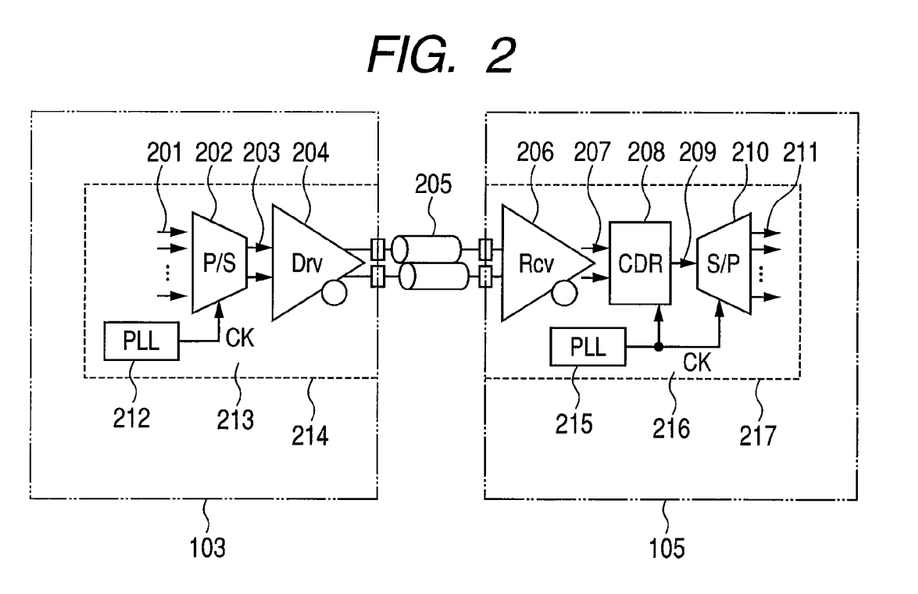
FIG. 2 is a view showing details of a differential transmission system between the boards.

FIG. 2 is a block diagram showing a transmission system for execution of data transfer. The transmission system includes the integrated circuit 103 on a transmission side, a transmission line 205, and the integrated circuit 105 on a receiving side. The integrated circuit 103 on the transmission side includes a serializer-deserializer (SerDes: Serializer/Deserializer) 214 on the transmission side. The integrated circuit 105 on the receiving side includes a serializer-deserializer 217 on the receiving side.

The serializer-deserializer 214 on the transmission side includes a parallel-serial data converter 202 (P/S), a transmission circuit (Drv) 204, and a phase-locked loop (PLL: Phase Locked Loop) 212.

On the other hand, the serializer-deserializer 217 on the receiving side includes a receiving circuit (Rcv) 206, a clock data recovery circuit (Clock Data Recovery) 208, a serial-parallel data converter 210 (S/P), and a phase-locked loop (PLL: Phase Locked Loop) 215.

The phase-locked loop 212 (PLL) supplies a clock 213 (CK) to the multiplexer (P/S) 202, and the output circuit 204 (Drv). Parallel data 201 is converted into serial data 203. The parallel-serial data converter 202 (P/S) converts the parallel data 201 into the serial data 203 on the basis of the clock 213 (CK). The transmission circuit 204 (Drv) outputs the serial data 203 inputted from the parallel-serial data converter (P/S) 202 to the transmission line 205.

The phase-locked loop 215 (PLL) supplies a clock 216 (CK) to the clock data recovery circuit 208 (Clock Data Recovery), and the serial-parallel data converter 210 (S/P). The receiving circuit 206 (Rcv) amplifies serial data inputted through the transmission line 205. The clock data recovery circuit 208 (CDR) adjusts phase-relationship between serial data 207 from the receiving circuit 206, and the clock 216 (CK) as supplied, thereby recovering serial data 209 to be outputted to the serial-parallel data converter 210 (S/P). The serial-parallel data converter 210 (S/P) converts the serial data 209 into parallel data 211 to be supplied within the integrated circuit 105 on the receiving side.

Figure 3:
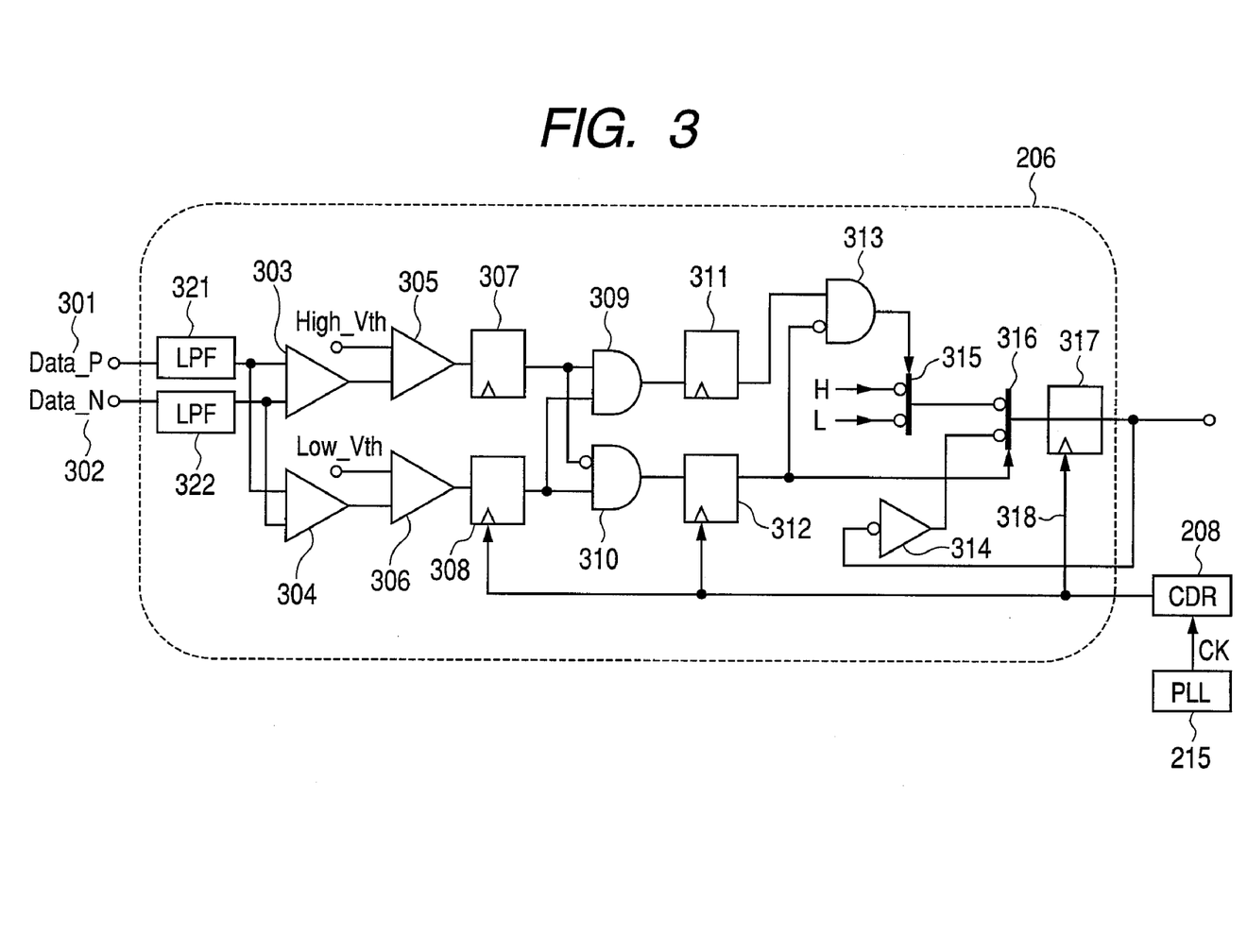
FIG. 3 is a view showing a configuration example of a receiving circuit in FIG. 2.

In FIG. 3, there is shown in detail the receiving circuit 206 (Rcv) of FIG. 2. The receiving circuit 206 (Rcv) is for amplification of the serial data as attenuated inside the transmission line 205.

The receiving circuit 206 includes low-pass filters (LPFs) 321, 322, differential single converters 303, 304, amplitude detectors (offset amps) 305, 306, a flip-flop (FF) 307, a flip-flop (FF) 308, an AND circuit (AND) 309, a logical operation circuit 310, a flip-flop (FF) 311, a flip-flop (FF) 312, a logical operation circuit 313, an inverter circuit (INV) 314, a selector circuit 315, a selector circuit 316, a flip-flop (FF) 317, a clock 318, the clock data recovery circuit (CDR) 208, and the phase-locked loop (PLL) 215.

Now, the flip-flop (FF) 307 holds a pulse signal in a logic state, outputting the logic state as held at timing for receiving the clock 318. The logical operation circuit 310 executes an operation for outputting a signal representing AND of an inverting signal outputted from the flip-flop 307, and an output signal from the flip-flop 308, that are fetched as two inputs.

A positive-side signal 301 (Data_P), and a negative-side signal 302 (Data_N) of a pair of differential signals having passed through the transmission line 205 are inputted to the differential single converters 303, 304, via the low-pass filters, respectively. The differential single converter 303 converts amplitude of the pair of the differential signals into a single signal, conveying an amplification signal to the amplitude detector (offset amp) 305, where an amplitude thereof is compared with a voltage level of a higher reference voltage, and if the amplitude is higher in value than the voltage level, the differential single converter 303 outputs a high level signal H, outputting a low level signal L if the amplitude is lower in value than the voltage level. The differential single converter 304 conveys the amplitude of the pair of the differential signals to the amplitude detector (offset amp) 306, comparing the amplitude with a voltage level of an lower reference voltage, and if the amplitude is higher in value than the voltage level, the differential single converter 304 outputs a high level signal H, outputting a low level signal L if the amplitude is lower in value than the voltage level.

Because a low frequency of frequency components contained in the differential signals is small in loss inside the transmission line 205, and an input amplitude when transmitted to the receiving circuit (Rcv) 206 is sufficiently large when conveyed to the amplitude detectors (offset amps) 305, 306, respectively, there is obtained only a determination that the amplitude will be larger in value than the higher reference voltage, and the lower reference voltage, or the amplitude will be smaller in value than the higher reference voltage, and the lower reference voltage. Because a high frequency of the frequency components is large in loss inside the transmission line 205, and the input amplitude when transmitted to the receiving circuit (Rcv) 206 is small when conveyed to the amplitude detectors (offset amps) 305, 306, respectively, there is obtained only a determination that the amplitude will be smaller in value than the higher reference voltage, and will be larger than the lower reference voltage.

A determination value of the higher reference voltage, as determined by the amplitude detector (offset amp) 305, is held at the flip-flop (FF) 307. Further, a determination value of the lower reference voltage, as determined by the amplitude detector (offset amp) 306, is held at the flip-flop (FF) 308. On the rising edge of the clock (CK) 318 from the clock data recovery circuit, the determination value is conveyed from the flip-flops (FFs) 307, 308 to the AND circuit 309, and the logical operation circuit 310. Logic values of the AND circuit 309, and the logical operation circuit 310, respectively, are conveyed from the flip-flops (FFs) 311, 312, respectively, to the logical operation circuit 313, and the selector circuit 316 on the rising edge of the clock (CK) 318. The logic value of the logical operation circuit 313 is turned into a selector signal of the selector circuit 315, and when the selector signal is "H", a signal "H" is outputted from the selector circuit 315 while when the selector signal is "L", a signal "L" is outputted from the selector circuit 315 to be conveyed to the selector circuit 316. The logic value of the selector circuit 316 is conveyed from the flip-flop (FF) 317 to the next stage on the rising edge of the clock (CK) 318. Further, when the selector signal from the flip-flop (FF) 312 is "H", the logic value of the selector circuit 316 conveys a value obtained by inverting a value previously outputted from the flip-flop (FF) 317 with the use of the inverter circuit (INV) 314.

If a reference voltage for use in making a determination between a high-frequency voltage component of a data signal, and a low-frequency voltage component thereof is set at the differential single converter (offset amp) 303 for making an higher-side determination, and the differential single converter (offset amp) 304 for making a lower-side determination, respectively, this will enable a high-speed data signal to be detected. Accordingly, there is no need for amplification of the high-frequency voltage component by use of a high-pass filter (HPF), so that it is possible to reduce an error rate in data determination, due to amplification of noise, reflection and a ringing component.

Figure 4:
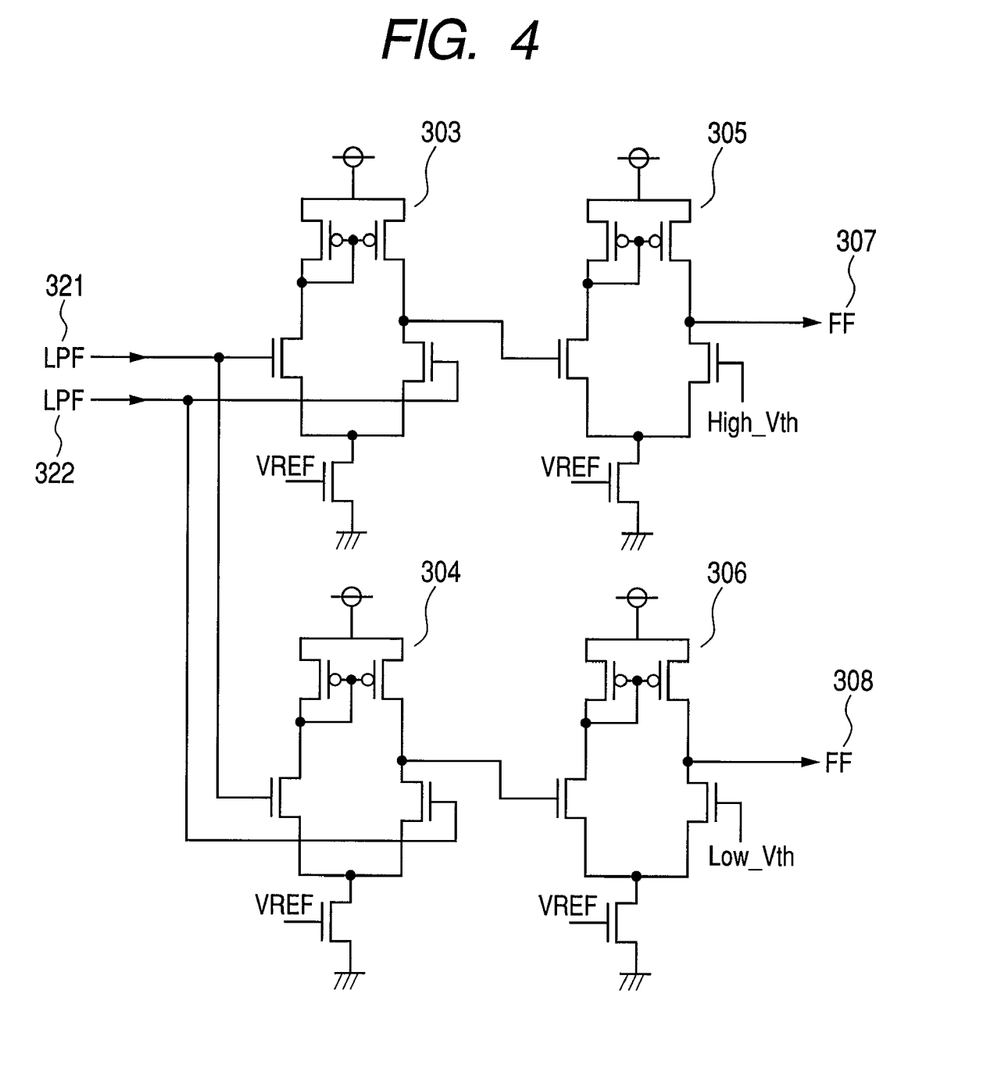
FIG. 4 is a view showing details of differential single converters, and amplitude detectors, shown in FIG. 3, respectively.

FIG. 4 is a view showing details of the differential single converters 303, 304, and the amplitude detectors (offset amps) 305, 306, respectively. The differential single converter is for receiving the pair of the differential signals, whereupon differential amplitudes are converted into a potential to be outputted. The amplitude detector (offset amp) is for setting a reference potential on a side thereof to be compared with a potential inputted to one side thereof, and outputting a high level signal when the potential inputted to the one side is higher than the reference potential while outputting a low level signal when the potential inputted to the one side is lower than the reference potential. The pair of the differential signals having passed through the low-pass filters (LPFs) 321, 322 is inputted to the differential single converters 303, 304, respectively. Output potentials dependent on differential amplitudes of the pair of the differential signals inputted to the differential single converters 303, 304, respectively, are inputted to the amplitude detectors (offset amps) 305, 306, respectively. The potentials inputted to the amplitude detectors (offset amps) 305, 306, respectively, are compared with a set reference voltage, outputting a determination result.

Figure 5:
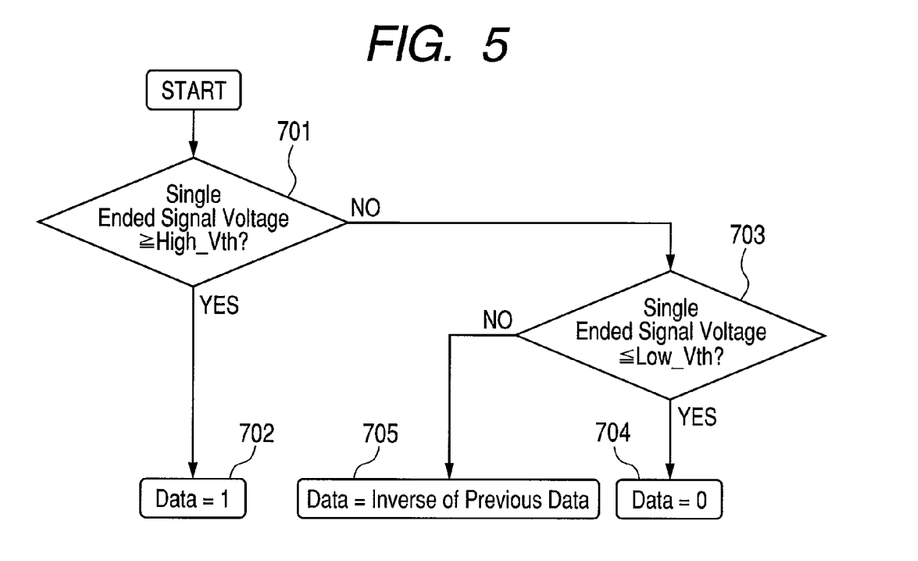
FIG. 5 is a view showing a flow chart of processing executed by the receiving circuit shown in FIG. 3.

In FIG. 5, there is shown a flow chart of an operation for data determination executed by the receiving circuit 206 shown in FIG. 3.

In step 701, amplitude of a single ended signal converted from the differential signals is compared with a voltage level of the higher reference voltage. If the amplitude of the single ended signal is larger than the voltage level of the higher reference voltage, the operation proceeds to step 702.

If the amplitude of the single ended signal is smaller than the voltage level of the higher reference voltage, the operation proceeds to step 703.

In the step 703, if the amplitude of the single ended signal is smaller than a voltage level of the lower reference voltage, the operation proceeds to step 704. If the amplitude of the single ended signal is larger than the voltage level of the lower reference voltage, the operation proceeds to step 705.

As a result, if the amplitude of the single ended signal is larger than the voltage level of the higher reference voltage, the operation proceeds to step 702, determining that a transmission signal to the serial-parallel data converter is at the high level, that is, "1".

If the amplitude of the single ended signal is smaller than the voltage level of the higher reference voltage, and is larger than the voltage level of the lower reference voltage, the operation proceeds to step 705, whereupon a determination value that has been determined previous time before being held is to inverted to be then conveyed to the serial-parallel data converter. More specifically, if the determination value as determined previous time is "0", the operation determines that the original transmission signal is "1". If the determination value as determined previous time is "1", the operation determines that the original transmission signal is "0".

If after identical transmission signals ("1s" or "0s") are transmitted in succession, signals different therefrom are transmitted, rising (or falling) will slow down due to intersymbol interference, so that it will take longer until a voltage level rises (or falls). As a result, a voltage level of the transmission signal will be lower than the higher reference voltage, and higher than the lower reference voltage. Even in this case, since the determination value that has been determined previous time before being held is inverted in the step 705, it is possible to correctly determine a transmission signal.

Further, in the case where the higher reference voltage, and the lower reference voltage are set so as to enable a data pattern "00110011" to be detected, it is possible to detect up to a data pattern "01010101" having a frequency twice as high as that for the data pattern "00110011".

Figure 6:
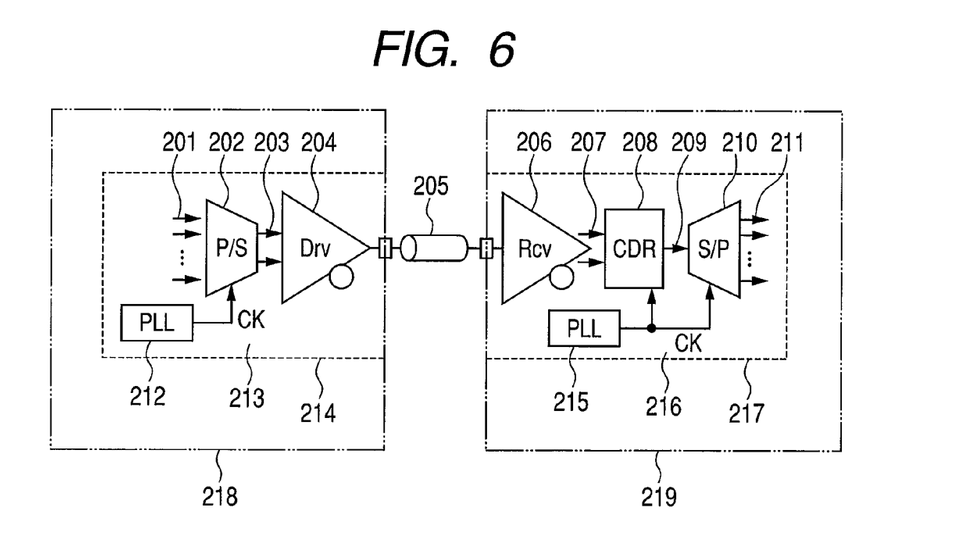
FIG. 6 is a view showing details of a single transmission system between the boards.

Furthermore, in the receiving circuit, the reference voltage for making a determination is set between the high-frequency voltage component, and the low-frequency voltage component, so that there is no need for processing to obtain margins of the data signal at a maximum transfer rate, in a voltage direction, and a phase direction, respectively. More specifically, instead of causing setting of the feed forward equalizer to be based on a loss in the transmission line of a data pattern at a maximum transfer rate, the setting can be made on the basis of a loss in the transmission line of the data pattern at a transfer rate lower than the maximum transfer rate. Accordingly, it is possible to reduce an amount of the emphasis, thereby holding back power consumption FIG. 6 is a view showing details of a single transmission system between boards. The single transmission system between boards, shown in FIG. 6, is basically the same as a single transmission system between boards in FIG. 4, but differs from the latter in that there is adopted a single ended transmission, that is, a data transmission method employing one length of a signal line by sharing the ground GND, and in consequence, the receiving circuit is partially changed.

The single ended transmission has drawbacks such that that ringing due to reflection is liable to occur, and the single ended transmission is susceptible to interference by signals of adjacent signal lines (crosstalk). In general, if a clock is in a range between several tens of MHz to several hundred MHz, use is made of differential transmission. The ringing refers to a rippling waveform generated upon a signal undergoing abrupt changes, such as a square wave signal, passing through a circuit net.

Figure 7:
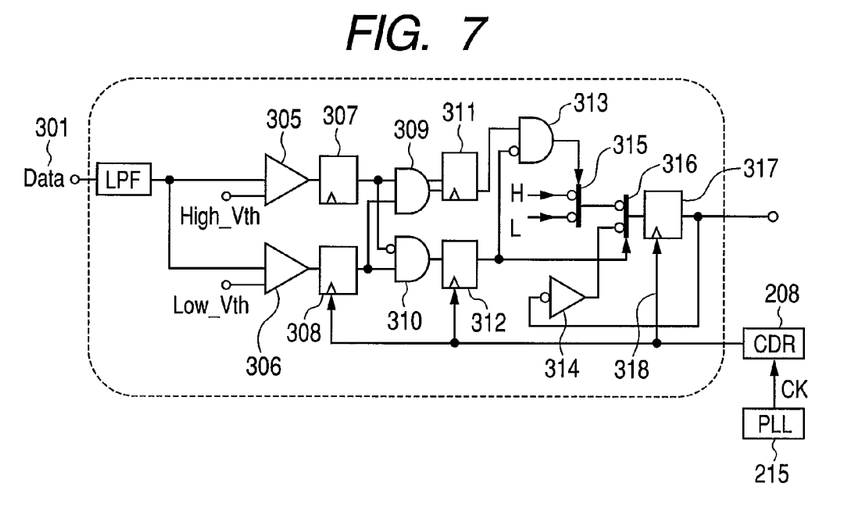
FIG. 7 is a view showing a configuration of a receiving circuit shown in FIG. 6.

FIG. 7 is a view showing a configuration of the receiving circuit shown in FIG. 6. The receiving circuit of FIG. 6 is basically the same as the receiving circuit shown in FIG. 3, but differs from the latter in that the single ended signal is inputted directly to the amplitude detectors (offset amps) 305, 306, respectively, without going through the respective differential single converters, and the single ended signal is compared with the higher reference voltage, and the lower reference voltage, respectively, thereby outputting a determination.

A flow chart of a processing operation executed by the receiving circuit in FIG. 6 is the same as the flow chart shown in FIG. 5, omitting therefore description thereof.

Figure 9:
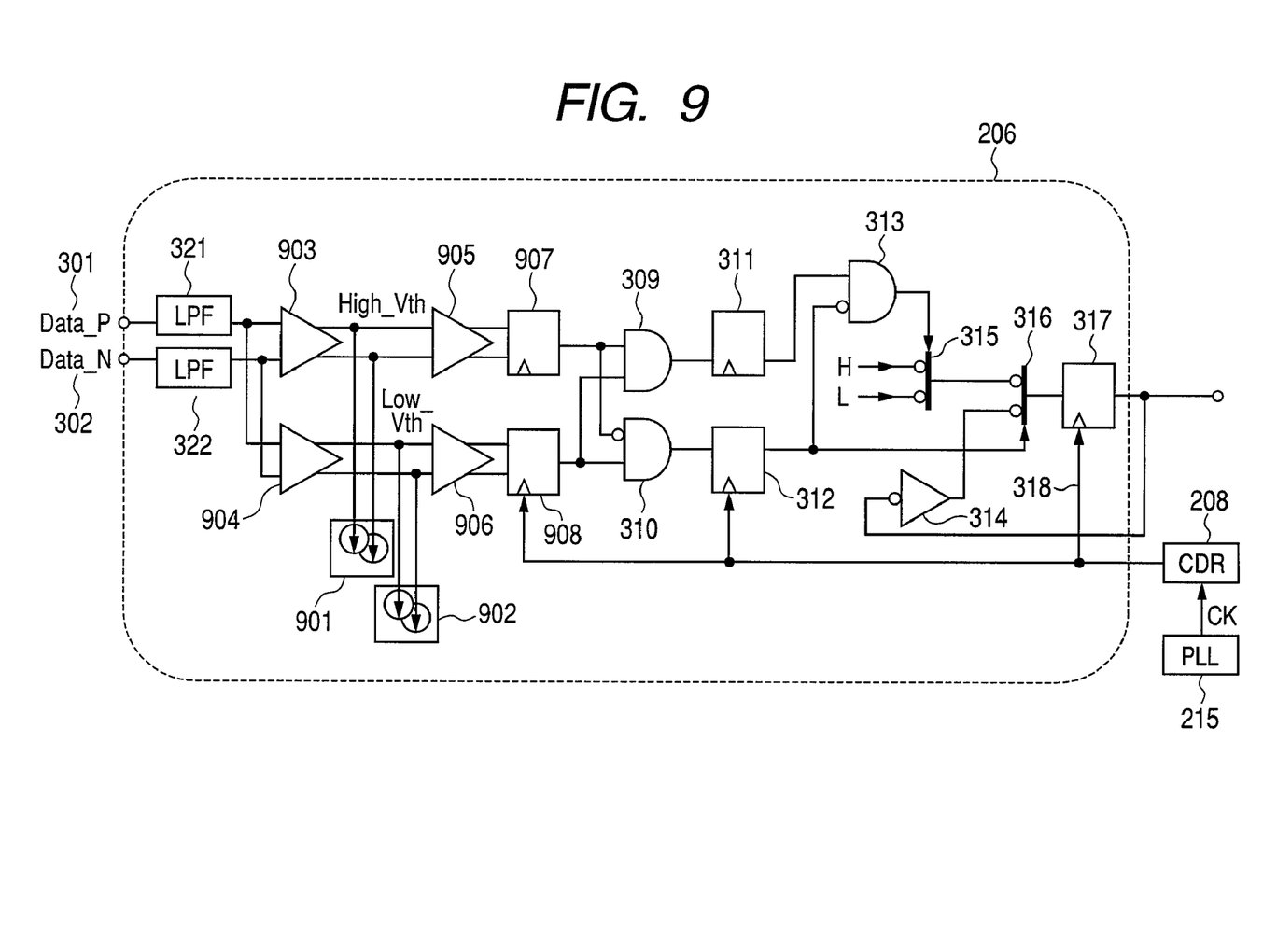
FIG. 9 is a view showing another example of a configuration of a receiving circuit shown in FIG. 2.

FIG. 9 is a view showing a configuration corresponding to that of the receiving circuit in FIG. 3. The receiving circuit of FIG. 9 differs from that of FIG. 3 in that differential amplifiers 903, 904, 905, 906, in FIG. 9, are substituted for the differential single converters (offset amps) 303, 304, and the amplitude detectors (offset amps) 305, 306, in the receiving circuit of FIG. 3, and offset circuits 901, 902 are added, thereby outputting the higher reference voltage, and the lower reference voltage, respectively. The differential amplifier is a circuit for amplifying the pair of the differential signals before outputting. The offset circuit is a circuit wherein a voltage level of the signal on one side of the pair of the differential signals is shifted in magnitude corresponding to either the higher reference voltage, or the lower reference voltage (an offset is provided). The two offset circuits are put to use such that when one of those circuits is used to cause a P-side voltage level to shift, the other is used to cause an N-side voltage level to shift.

In the offset circuit, if in comparison with the voltage level in one polarity, shifted in magnitude corresponding to either the higher reference voltage, or the lower reference voltage, an amplitude level in the other polarity is higher, a high level signal is outputted, and if the amplitude level in the other polarity is lower, a low level signal is outputted.

Having described the invention in detail as above with reference to the present embodiment, it is to be understood that the invention be not limited thereto, and that various changes and modifications can be made in the invention without departing from the spirit and scope thereof.

What is claimed is:

1. A receiving apparatus comprising:
    differential single converters each for subjecting differential signals inputted from a transmission line to differential amplification to be outputted as a single ended signal;
    a first amplitude detector coupled to a first one of said differential signal detectors for comparing the single ended signal with a higher reference voltage as a predetermined voltage; and
    a second amplitude detector coupled to a second one of said differential signal detectors for comparing the single ended signal with a lower reference voltage as a second predetermined voltage,
    wherein if the first amplitude detector detects that amplitude of the single ended signal is larger in value than the higher reference voltage, the first amplitude detector determines that the differential signal is a first level signal,
    wherein if the second amplitude detector detects that the amplitude of the single ended signal is smaller in value than the lower reference voltage, the second amplitude detector determines that the differential signal is a second level signal, and
    wherein if the first amplitude detector detects that the amplitude of the single ended signal is smaller in value than the higher reference voltage, and the second amplitude detector detects that the amplitude of the single ended signal is larger in value than the lower reference voltage, the present differential signal is determined as the second level signal in the case where an immediately preceding differential signal is determined as the first level signal while the present differential signal is determined as the first level signal in the case where the immediately preceding differential signal is determined as the second level signal.

2. The receiving apparatus according to claim 1,
    wherein the higher reference voltage is higher than the lower reference voltage, and
    wherein the first level signal is higher in value than the second level signal.

3. The receiving apparatus according to claim 1, wherein the differential single converters, the first amplitude detector, and the second amplitude detector are each a differential amplifier.

4. A receiving apparatus comprising:
    a first amplitude detector for comparing a single ended signal inputted from a transmission line with a higher reference voltage as a predetermined voltage; and
    a second amplitude detector for comparing the single ended signal with a lower reference voltage as a second predetermined voltage,
    wherein if the first amplitude detector detects that amplitude of the single ended signal is larger in value than the higher reference voltage, the first amplitude detector determines that a differential signal is a first level signal, if the second amplitude detector detects that the amplitude of the single ended signal is smaller in value than the lower reference voltage, the second amplitude detector determines that the differential signal is a second level signal, and wherein if the first amplitude detector detects that the amplitude of the single ended signal is smaller in value than the higher reference voltage, and the second amplitude detector detects that the amplitude of the single ended signal is larger in value than the lower reference voltage, the present differential signal is determined as the second level signal in the case where an immediately preceding differential signal is determined as the first level signal while the present differential signal is determined as the first level signal in the case where the immediately preceding differential signal is determined as the second level signal.

5. The receiving apparatus according to claim 4, wherein the higher reference voltage is higher than the lower reference voltage, and wherein the first level signal is higher in value than the second level signal.

6. The receiving apparatus according to claim 4, wherein the first amplitude detector, and the second amplitude detector are each a differential amplifier.

7. A signal detection method comprising:

subjecting differential signals inputted from a transmission line to differential amplification by each of a plurality of differential single converters to be outputted as a single ended signal;

comparing the single ended signal with a higher reference voltage as a predetermined voltage by use of a first amplitude detector coupled to a first one of said differential signal detectors; and comparing the single ended signal with a lower reference voltage as a second predetermined voltage by use of a second amplitude detector coupled to a second one of said differential signal detectors, wherein if the first amplitude detector detects that amplitude of the single ended signal is larger in value than the higher reference voltage, the first amplitude detector determines that a differential signal is a first level signal, wherein if the second amplitude detector detects that the amplitude of the single ended signal is smaller in value than the lower reference voltage, the second amplitude detector determines that the differential signal is a second level signal, and wherein if the first amplitude detector detects that the amplitude of the single ended signal is smaller in value than the higher reference voltage, and the second amplitude detector detects that the amplitude of the single ended signal is larger in value than the lower reference voltage, the present differential signal is determined as the second level signal in the case where an immediately preceding differential signal is determined as the first level signal while the present differential signal is determined as the first level signal in the case where the immediately preceding differential signal is determined as the second level signal.

8. The signal detection method according to claim 7, wherein the higher reference voltage is higher than the lower reference voltage, and wherein the first level signal is higher in value than the second level signal.

9. The signal detection method according to claim 7, wherein the first amplitude detector, and the second amplitude detector are each a differential amplifier.

* * * * *